Jan. 19, 1926.
E. C. ISOM
1,570,352
CALCULATOR
Filed Oct. 19, 1925    4 Sheets-Sheet 2
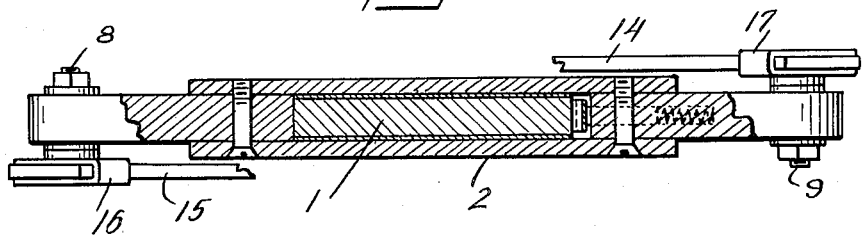
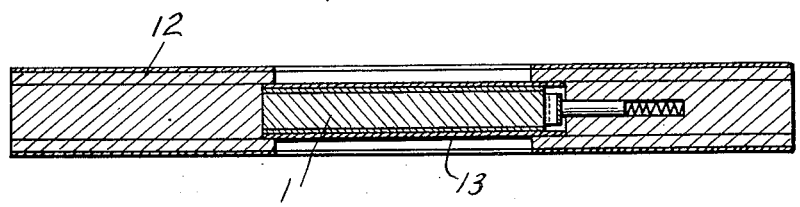
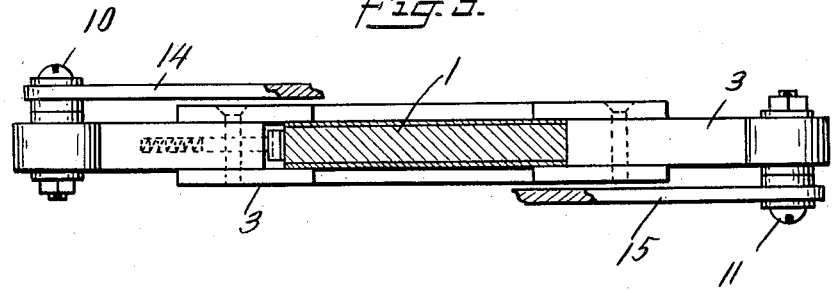
INVENTOR
Elbert C. Isom
BY
ATTORNEYS

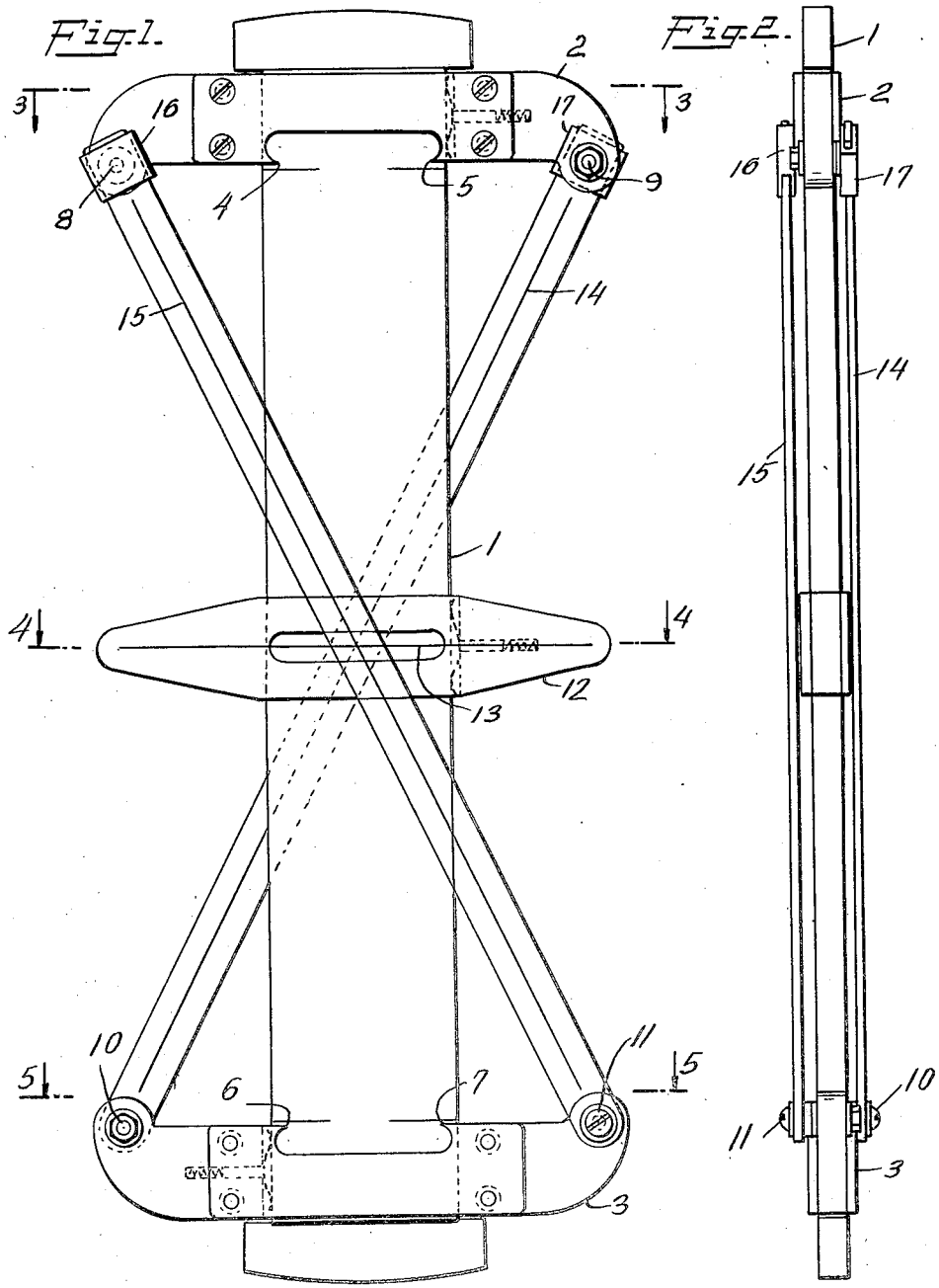

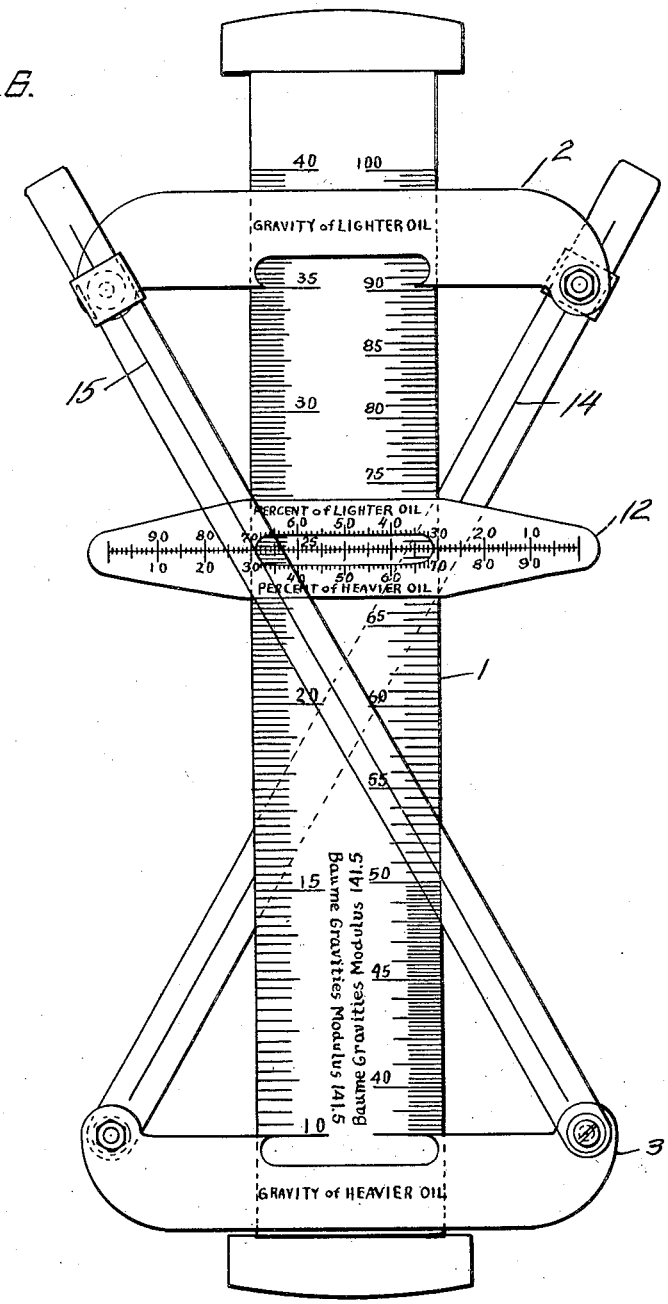

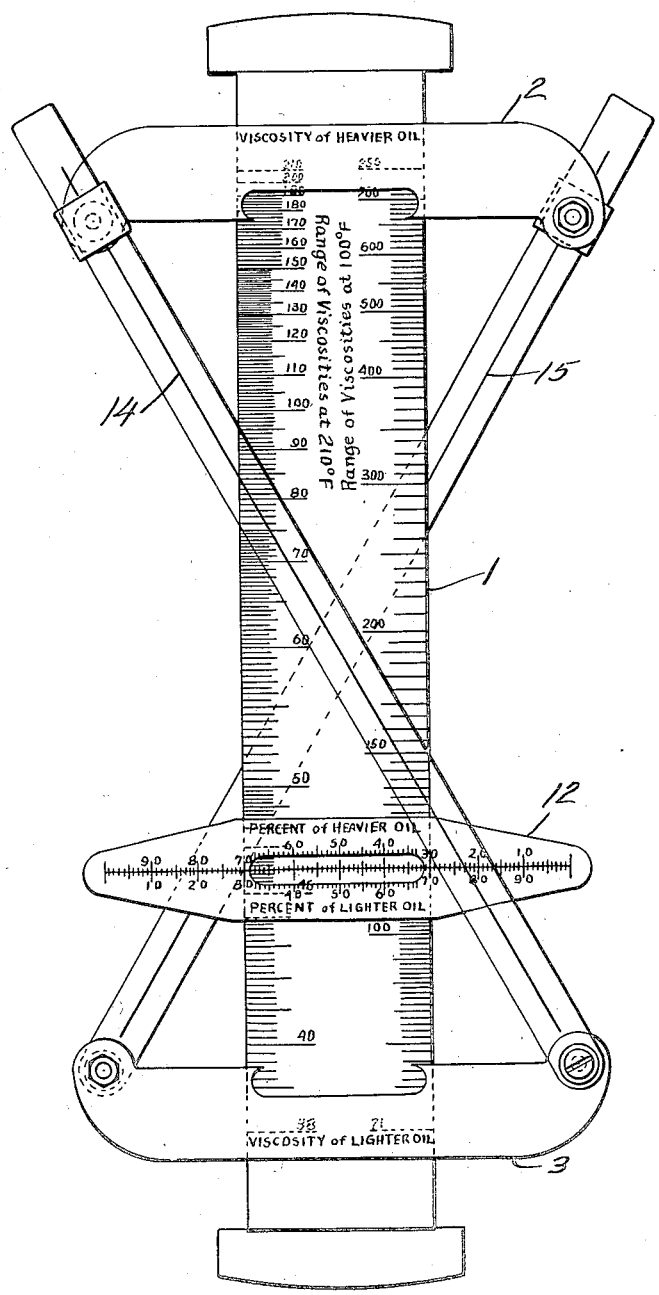

Patented Jan. 19, 1926.

1,570,352

UNITED STATES PATENT OFFICE.

ELBERT C. ISOM, OF GARDEN CITY, NEW YORK.

CALCULATOR.

Application filed October 19, 1925. Serial No. 63,353.

*To all whom it may concern:*

Be it known that I, ELBERT C. ISOM, a citizen of the United States, residing at Garden City, in the county of Nassau, State of New York, have invented certain new and useful Improvements in Calculators; and I do hereby declare the following to be a full, clear, and exact description of the invention, such as will enable others skilled in the art to which it appertains to make and use the same.

This invention relates to an improved calculating device for making computations with respect to a property of a mixture containing two components the value of which property is not proportional to the mean of the values of the property of the separate components. The calculating device of this invention is of special value and application in connection with computations relating to mixtures and blends of hydrocarbon oils, for example, in connection with computations relating to the viscosity or specific gravity of such blends or mixtures.

In the compounding of hydrocarbon oils, for example to produce products of definite viscosity or of definite specific gravity, much time and labor are involved in tests and experiments to determine the proportions necessary to secure a product having the desired properties. Properties such as viscosity and specific gravity cannot readily be calculated accurately by arithmetical means making it necessary to approach a desired result by trial and error. This, of course, is expensive, time-consuming, and frequently the cause of inaccuracies. Viscosities, even under the same temperature conditions, are not arithmetically related, making it impossible to calculate by any practicable method the viscosity of a blend of two oils of known viscosities or the proportions of two oils of known viscosities necessary to blend to produce a product of definite viscosity. Specific gravities can be estimated by arithmetical calculations, but here also the results are not accurate because the volume of a blend is not arithmetically related to the volumes of the separate components.

The calculating device of the present invention overcomes these difficulties, and makes it possible accurately to make computations with respect to the properties of such mixtures by a simple mechanical operation, eliminating the errors involved in known methods of arithmetical estimation and largely avoiding trial and error as a necessary method to secure a desired result.

The invention will be further described in connection with the accompanying drawings which illustrate a device embodying the invention, but it will be understood that this further and more detailed description and illustration are by way of exemplification and that the invention is not limited thereto.

In the drawings,

Fig. 1 shows the mechanical details, in plan, of a calculating device embodying the invention, Fig. 2 is a side view of the device illustrated in Fig. 1, Fig. 3 is a section on line 3—3 of Fig. 1,
Fig. 4 is a section on line 4—4 of Fig. 1,
Fig. 5 is a section on line 5—5 of Fig 1,
Fig. 6 is a view similar to Fig. 1 showing the device with scales adapted for making computations with respect to specific gravity, Fig. 7 is a view similar to Fig. 1, showing the device with scales adapted for making computations with respect to viscosity.

Referring to Figs. 1 to 5, the embodiment of the invention illustrated comprises a body portion 1 adapted to carry one or more scales on the face thereof, a pair of slides 2 and 3 movable on the body portion each carrying indicators 4, 5, 6 and 7 and pivots 8, 9, 10 and 11, another slide 12 movable on the body portion adapted to carry one or more scales transverse to the axis of the body portion and having an indicator 13 moving over the scale space on the body portion, and indicators 14 and 15 carried by the pivots 8, 9, 10 and 11 on the slides 2 and 3 moving over the scale space on the slide 12. Indicators may be arranged on opposite sides of the device to allow for the accommodation of a number of scales, and scales for making computations with respect to different properties may be arranged on opposite sides of the device. The indicators 14 and 15 comprise transparent arms with an indicating line or mark suitably arranged thereon, one end of each arm being pivoted to the slide 3, as at 10 and 11, and the other end of the arms being supported by the pivots 8 and 9 on the slide 2 in carriers 16 and 17 adapted to permit motion of the slides 2 and 3 relative to each other. In the device illustrated, indicator 15 is arranged to move over a scale on one side of the slide 12 and indicator 14 to move over a scale on the other side of the slide 12. The indicator or indicators on the slide 12 are mounted on transparent inserts in the slide to permit of viewing the scales on the body portion adjacent thereto. In the device illustrated, the centers of the pivots on the slides 2 and 3 fall in lines normal to the axis of the body portion through the indicators on these respective slides, the center line of the transverse scale on the slide 12 is also normal to the axis of the body portion and co-incidental with the indicator on this slide, and the indicators 14 and 15 on the arms carried by the pivots on the slides 2 and 3 are in the form of straight lines passing through the centers of the supporting pivots. It will be apparent that the indicators on each of the slides might be displaced equal distances either above or below lines normal to the axis of the body portion and passing through the pivot centers and the center line of the transverse scale; for example, to allow of placing of the indicator on the slide 12 away from the center line of the transverse scale. A spring take up is provided in each of the slides 2, 3 and 12 to maintain them in proper relation to the body portion while permitting their easy motion along the body portion.

The device with scales in place on the body portion 1 and on the slide 12 is illustrated in Figs. 6 and 7. By reference to these figures of the drawings it will be noted that the transverse scale on the slide 12 is uniformly divided between terminals lying in the paths of the pivots on the slides 2 and 3 into divisions representing percentages and corresponding to percentages of the distance between the terminals of the scale. This slide might also be calibrated with uniform divisions representing proportional parts, but it is one of the particular advantages of the calculating device of this invention that it permits of the arrangement of a scale reading directly in percentages on the slide 12 eliminating any further computations to transfer values in proportional parts into values in percentages. The scales on the body portion 1 terminate with values of the property to which the scale relates of two separate components and the divisions on the scale between these values correspond to the values of this property of mixtures of the two components in proportions equivalent to the distance between each division and the terminals of the scale. Scales may thus be developed for any particular property with respect to which it may be desired to make computations by taking a pair of components having extreme values for this property and determining the value of the property for a series of mixtures of the two components.

In the drawings, actual scales for making components with respect to hydrocarbon oils are shown for viscosities at two different temperatures and for specific gravities at one temperature. It will be apparent that the scales may be calibrated in any convenient system, for example, the scales relating to specific gravity may be calibrated to read directly in Baumé degrees or in Twadell degrees. The scales illustrated for use in connection with computations relating to specific gravity are calibrated to make determinations over two ranges, from 10° to 40° Baumé and from 38° to 100° Baumé, with a modulus of 141.5, and the scales for use in making computations with respect to viscosities are calibrated to make computations over a range of from 38 to 210 Saybolt at a temperature of 210° F. and over a range of from 71 to 750 Saybolt at a temperature of 100° F.

The operation of the calculating device will be described by a specific example with reference to a viscosity calculation and by specific example with reference to a specific gravity calculation.

First, referring to Fig. 6, assuming that it is desired to blend a 10° Baumé crude oil with a 35° Baumé gas oil to make a fuel oil having a gravity of from 24° to 26° Baumé. The percentages of the two components necessary to give a blend having this desired characteristic are determined as follows: Working with the left hand scale on the body portion, set the slide 2 so that the indicator is at 35, the gravity of the gas oil, and set the slide 3 so that the indicator is at 10, the gravity of the crude oil. Set slide 12 so that the desired gravity of the blend, 25, is under the indicator of this slide. The indicator 15 will then be found to intersect the center line of the transverse scale on the slide 12 at a division corresponding to 69% of the lighter oil, the gas oil, and 31% of the heavier oil, the crude oil. The blend of these two oils in these proportions will be found to have the desired Baumé gravity.

Second, referring to Fig. 7, assuming that it is desired to blend a lubricating oil having a Saybolt viscosity of 39–40 with a lubricating oil having a Saybolt viscosity of 170–180 to give a blend having a Saybolt viscosity of 45–47. The percentages of the two components necessary to give a blend having this desired characteristic are determined as follows: Working with the left hand scale on the body portion, set slide 2 so that the indicator is at 175, the viscosity of the heavier component, and set slide 3 so that the indicator is at 39.5, the viscosity of the lighter component. Set slide 12 so that the indicator is at 46, the desired viscosity of the blend. The indicator 14 will then be found to intersect the center line of the transverse scale on the slide 12 at a division corresponding to 23% of the heavier and more viscous oil and 77% of the lighter and less viscous oil. The blend of these two oils in these proportions will be found to have the desired viscosity.

It should be noted, particularly with respect to calculations relating to viscosity, that computations can be made only with viscosities at the same temperature and at the temperature for which the scale on the body operation is calibrated. This is also true with reference to computations with respect to other properties, as will be apparent from the fact that the scales on the body portion are in any case prepared from empirical data relating to a fixed set of conditions.

Other computations which can be made with the calculating device of the invention, carrying scales of the type illustrated, include determination of the viscosity of a blend of given percentages of oils of known viscosities, determination of the viscosity of an unknown component in a blend given the viscosity of the blend and of the other component and the percentages of the components, determination of the specific gravity of a blend given the proportions of the components and their specific gravities, and determination of the specific gravity of an unknown component in a blend given the specific gravity of the blend and the other component and the proportions of the unknown components.

It will be apparent that the invention provides an improved calculating device of general applicability in making computations with respect to properties of mixtures of two components where the value of the property of the mixture is not proportional to the mean of the values of the property of the separate components. While the calculating device has been described particularly in connection with determinations relating to viscosity and specific gravity, it will be apparent that it could be employed in the determination of other properties of similar mixtures; and also that it could be employed in making determinations of these or other properties under conditions different than those for which the scales specifically illustrated are calibrated, for example at other temperatures. The calculating device of the invention is also useful in making computations with respect to mixtures containing three or more components, as such mixtures can be regarded as a mixture of a pair of components each or either of which can then be treated as a mixture of two components, and so on.

I claim:

1. A calculating device for making computations with respect to a property of a mixture containing two components the value of which property is not proportional to the mean of the values of the property of the separate components, which comprises a body portion carrying a scale terminating with values of the property of two separate components and with divisions therebetween corresponding to values of the property of mixtures of the two components in proportions equivalent to the distance between each division and the terminals of the scale, a pair of slides movable on the body portion each carrying an indicator moving over the scale and a pivot, another slide movable on the body portion carrying a scale with uniform divisions transverse to the scale on the body portion and an indicator moving over the scale on the body portion, and an indicator moving over the scale on the last mentioned slide and carried by the pivots on the first mentioned slides.

2. A calculating device for making computations with respect to a property of a mixture containing two components the value of which property is not proportional to the mean of the values of the property of the separate components, which comprises a body portion carrying a scale terminating with values of the property of two separate components and with divisions therebetween corresponding to values of the property of mixtures of the two components in proportions equivalent to the distance between each division and the terminals of the scale, a pair of slides movable on the body portion each carrying an indicator moving over the scale and a pivot, another slide movable on the body portion carrying a scale transverse to the scale on the body portion terminating at opposite ends in the paths of the pivots on the first mentioned slides with divisions between the terminals corresponding to percentages of the distance between the terminals and carrying an indicator moving over the scale on the body portion, and an indicator moving over the scale on the last mentioned slide and carried by the pivots on the first mentioned slides.

In testimony whereof I affix my signature.

ELBERT C. ISOM.